United States Patent
Drews et al.

(10) Patent No.: US 10,121,488 B1
(45) Date of Patent: Nov. 6, 2018

(54) OPTIMIZING CALL QUALITY USING VOCAL FREQUENCY FINGERPRINTS TO FILTER VOICE CALLS

(71) Applicant: Sprint Communications Company L.P., Overland Park, KS (US)

(72) Inventors: Gregory Anderson Drews, Marietta, GA (US); Brian Dale Farst, Los Angeles, CA (US); Young Suk Lee, Ardmore, PA (US); Raymond Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 111 days.

(21) Appl. No.: 14/629,147

(22) Filed: Feb. 23, 2015

(51) Int. Cl.
| | |
|---|---|
| *G10L 21/02* | (2013.01) |
| *G10L 25/18* | (2013.01) |
| *G10L 21/013* | (2013.01) |
| *G10L 19/018* | (2013.01) |
| *H04M 3/22* | (2006.01) |

(52) U.S. Cl.
CPC .......... *G10L 21/013* (2013.01); *G10L 19/018* (2013.01); *G10L 21/02* (2013.01); *H04M 3/2236* (2013.01); *G10L 25/18* (2013.01); *G10L 2021/0135* (2013.01)

(58) Field of Classification Search
CPC . G10L 21/02; G10L 21/0208; G10L 21/0232; G10L 21/0272; G10L 21/028; G10L 25/18
USPC .............................. 704/226–227, 246, 270.1
See application file for complete search history.

(56) References Cited

U.S. PATENT DOCUMENTS

| | | | | |
|---|---|---|---|---|
| 5,630,015 | A * | 5/1997 | Kane ...................... | G10L 15/20 704/203 |
| 2004/0220798 | A1 * | 11/2004 | Chi ...................... | B60R 25/257 704/201 |
| 2005/0086056 | A1 * | 4/2005 | Yoda ...................... | G10L 15/24 704/246 |
| 2006/0149547 | A1 * | 7/2006 | Miyazaki ................ | G10L 17/00 704/247 |
| 2006/0155549 | A1 * | 7/2006 | Miyazaki ................ | G10L 15/26 704/275 |
| 2008/0169903 | A1 * | 7/2008 | Fein ...................... | G06F 21/32 340/5.84 |

(Continued)

FOREIGN PATENT DOCUMENTS

CN 103873714 A * 6/2014

OTHER PUBLICATIONS

Machine Translation and EPO Abstract of Min (CN 103873714 A).*

*Primary Examiner* — James Wozniak (57) ABSTRACT

Methods and systems are provided for optimizing call quality and improving network efficiency by reducing bandwidth requirements at the individual-voice-call level. Embodiments provided herein build vocal fingerprints that correspond to the frequency range of the human voice, as well as the frequency range of the voice of individual users. The vocal fingerprints are used minimize and reduce the transmission of background noise and ambient sound captured using HD voice while retaining the frequency range of a user's voice in HD voice. This filtered HD voice frequency range is then transmitted to recipients over the network. The reduced frequency range lowers bandwidth usage and conserves network resources, all while optimizing the call quality for individual users.

18 Claims, 4 Drawing Sheets

(56) References Cited

U.S. PATENT DOCUMENTS

| | | | |
|---|---|---|---|
| 2009/0018843 A1* | 1/2009 | Kawashima | G10L 21/02 704/278 |
| 2009/0044113 A1* | 2/2009 | Jones | G06T 13/40 715/707 |
| 2009/0094029 A1* | 4/2009 | Koch | H04M 3/42221 704/246 |
| 2010/0086108 A1* | 4/2010 | Jaiswal | G10L 17/005 379/88.04 |
| 2010/0323615 A1* | 12/2010 | Vock | H04M 1/60 455/26.1 |
| 2011/0093261 A1* | 4/2011 | Angott | G10L 15/10 704/205 |
| 2011/0107215 A1* | 5/2011 | Klappert | G06F 3/167 715/716 |
| 2011/0171921 A1* | 7/2011 | Son | H04B 1/1036 455/296 |
| 2011/0237295 A1* | 9/2011 | Bartkowiak | H04R 25/505 455/556.1 |
| 2011/0295598 A1* | 12/2011 | Yang | G10L 21/038 704/205 |
| 2012/0127342 A1* | 5/2012 | Ohtsuka | G10L 21/0208 348/231.4 |
| 2013/0030789 A1* | 1/2013 | Dalce | G06F 17/289 704/2 |
| 2013/0096917 A1* | 4/2013 | Edgar | G10L 15/00 704/246 |
| 2013/0231924 A1* | 9/2013 | Zakarauskas | G10L 21/02 704/207 |
| 2014/0044269 A1* | 2/2014 | Anderson | H04R 5/04 381/57 |
| 2014/0056439 A1* | 2/2014 | Kim | H04R 3/00 381/92 |
| 2014/0088973 A1* | 3/2014 | Gibbs | G10L 19/20 704/500 |
| 2014/0172422 A1* | 6/2014 | Hefetz | G10L 19/00 704/229 |
| 2014/0249823 A1* | 9/2014 | Hayakawa | G10L 25/63 704/270 |
| 2014/0372111 A1* | 12/2014 | Trammell | G10L 21/0364 704/227 |
| 2014/0379343 A1* | 12/2014 | Karimi-Cherkandi | G10L 21/02 704/246 |
| 2015/0117690 A1* | 4/2015 | Mauger | H04R 25/606 381/326 |
| 2015/0256930 A1* | 9/2015 | Yamakawa | H04R 3/002 704/205 |
| 2015/0331848 A1* | 11/2015 | Burgmeier | G06F 17/2735 704/8 |
| 2015/0372378 A1* | 12/2015 | Anderson | G01R 33/283 343/905 |
| 2016/0005420 A1* | 1/2016 | Furuta | G10L 21/0364 704/205 |

* cited by examiner

OPTIMIZING CALL QUALITY USING VOCAL FREQUENCY FINGERPRINTS TO FILTER VOICE CALLS

CROSS-REFERENCE TO RELATED APPLICATIONS

Non-applicable.

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, methods and systems for generating customized vocal signatures or "fingerprints" for individual mobile device users. Vocal signatures or fingerprints may be generated and refined using voice calls received from individual users. In addition, methods and systems are provided for creating a global vocal signature or fingerprint that is representative of a population of individual users.

This disclosure further describes methods and systems for optimizing the call quality of individual users by using vocal fingerprints corresponding to the individual users, a global vocal fingerprint, or both, to remove background noise, static, unwanted ambient sound, and other extraneous or sound quality detractors that impair, interfere, and/or degrade call quality. As such, call quality, as experienced by individual users, is improved over a telecommunications network. Additionally, optimizing call quality for each individual user further serves to improve technical aspects of the entire telecommunications network. By reducing a range of frequencies and corresponding data that is transmitted with each voice call over the telecommunications network, the bandwidth required for each voice call is also lowered. Thus, bandwidth usage and bandwidth requirements are reduced across the network and across the plurality of voice calls. This has the effects of conserving network resources, stretching existing network infrastructure farther, and increasing the efficiency of the network itself.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the system, methods, and services discussed. These acronyms and shorthand notations are solely intended for the purpose of providing an easy methodology of communicating the ideas expressed herein and are in no way meant to limit the scope of the present invention. The following is a list of these acronyms:

| | |
|---|---|
| BTS | Base Transceiver Station |
| CDMA | Code Division Multiple Access |
| eNodeB | Evolved Node B |
| EVDO | Evolution-Data Optimized |
| GPS | Global Positioning System |
| GSM | Global System for Mobile Communications |
| HRPD | High Rate Packet Data |
| eHRPD | Enhanced High Rate Packet Data |
| LTE | Long Term Evolution |
| LTE-A | Long Term Evolution Advanced |
| RNC | Radio Network Controller |
| SyncE | Synchronous Ethernet |
| TDM | Time-Division Multiplexing |
| WAN | Wide Area Network |
| WiMAX | Worldwide Interoperability for Microwave Access |

Further, various technical terms are used throughout this description. A definition of such terms can be found in, for example, Newton's Telecom Dictionary by H. Newton, 27th Edition (2013). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. Embodiments of the technology may include, for example, computer-readable media. Computer-readable media includes both volatile and nonvolatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and communications media.

Computer storage media, or machine-readable media, include media implemented in any method or technology for storing information. Examples of stored information include computer-useable instructions, data structures, program modules, and other data representations. Computer storage media include, but are not limited to, RAM, ROM, EEPROM, flash memory or other memory technology, CD-ROM, digital versatile discs (DVDs), holographic media or other optical disc storage, magnetic cassettes, magnetic tape, magnetic disc storage, and other magnetic storage devices. These memory components can store data momentarily, temporarily, or permanently. Computer storage media may generally be differentiated from communications media, as computer storage media does not include transitory signals.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

In a first embodiment, a system for optimizing overall network call quality and reducing network bandwidth load is provided. The system includes a server communicatively coupled to a wireless network. In embodiments, the server includes a vocal-fingerprint database storing a plurality of vocal fingerprints, each of the plurality of vocal fingerprints corresponding to a frequency transmission range of a voice of one or more individual users. The server also includes, in embodiments, a voice-call-transmission monitoring module that intercepts one or more voice-call transmissions. And, a vocal-fingerprint referencing module that references the vocal-fingerprint database to determine one or more frequency ranges of the one or more voice-call transmissions intercepted that outlie one or more of the frequency transmission ranges of the plurality of vocal fingerprints is further included on the server. The server includes a voice-call-transmission optimization module that removes the one or more frequency ranges of the voice-call transmissions that outlie the one or more frequency transmission ranges of the plurality of vocal fingerprints, in embodiments.

In a second embodiment, a method for improving call quality by filtering out frequencies outside of a specified frequency transmission range is provided. The method includes receiving a voice-call transmission including data and referencing a vocal fingerprint. A vocal fingerprint includes a frequency transmission range corresponding to a range of a human voice. The method further includes, in embodiments, determining one or more frequency ranges of the voice-call transmission data that are outside of the frequency transmission range of the vocal fingerprint. Finally, the method includes communicating only voice-call transmission data that is within the frequency transmission range of the vocal fingerprint, in embodiments.

In a third embodiment, one or more computer-readable media having computer-executable instructions embodied thereon are provided that, when executed, perform a method for maintaining and improving voice-call quality over a wireless network. In embodiments, the method includes monitoring a plurality of frequencies comprising a voice transmission. The plurality of frequencies is compared to one or more stored vocal fingerprints comprising a frequency transmission range. In embodiments, the method also includes filtering outlying frequencies, wherein outlying frequencies comprise a range of frequencies in the voice transmission that outlie the frequency transmission range of the one or more stored vocal fingerprints. Utilizing the outlying frequencies, the voice transmission over the wireless network is optimized, in embodiments.

Figure 1:
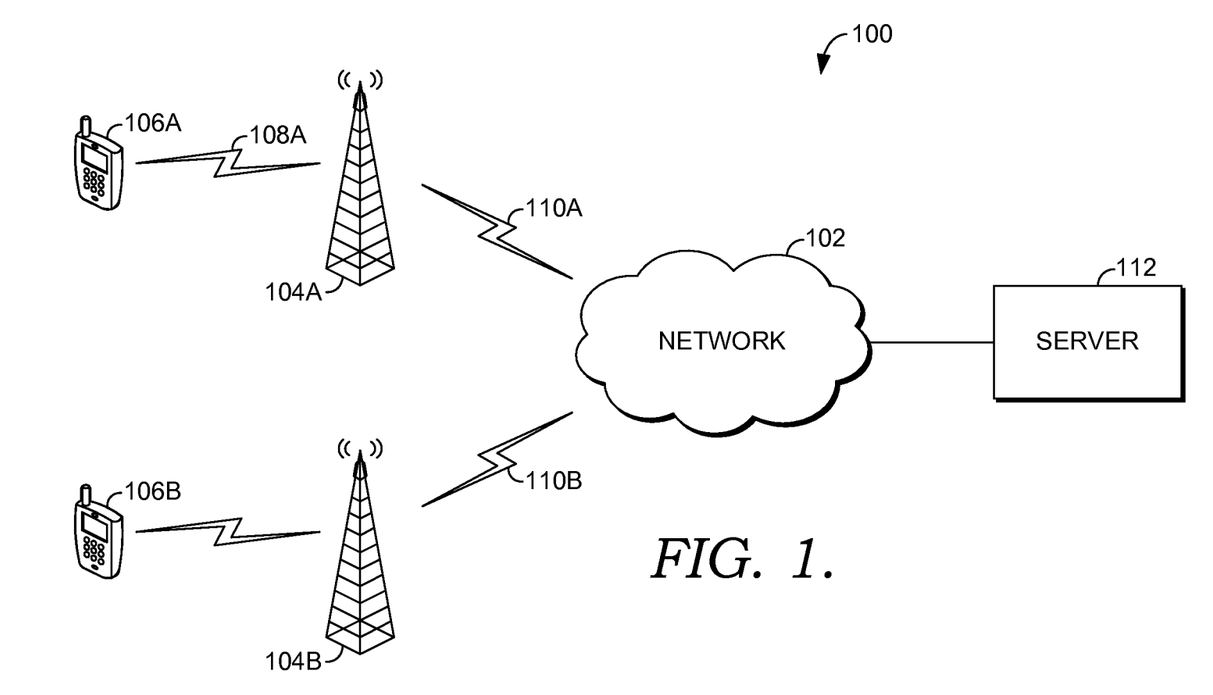
FIG. 1 depicts an exemplary networking environment for carrying out embodiments of the present invention.

Beginning with FIG. 1, it depicts an illustrative operating environment, referenced generally by the numeral 100. The illustrative operating environment 100 enables improved call quality and network efficiency using systems and methods described hereinafter. The illustrative operating environment 100 shown in FIG. 1 is merely an example of one suitable operating environment and is not intended to suggest any limitation as to the scope of use or functionality of embodiments of the present invention. For instance, the telecommunications network 102 illustrated in the illustrative operating environment 100 may operate using a particular technology, such as GSM, CDMA, WAN, Wi-Fi, WiMAX, LTE, LTE Advanced, EVDO, HRPD, eHRPD, and the like. These technologies are listed for exemplary purposes only and are not meant to limit the scope of the present invention. In one embodiment, the operating environment 100 of FIG. 1 operates using LTE technology, but may also operate using other technologies as well. Additionally, the illustrative operating environment 100 may comprise one or more of the components illustrated in FIG. 1, but in one embodiment, the illustrative operating environment 100 includes one or more cell towers 104A and 104B, a BTS, an RNC, gateways, etc. Not all components that make up a telecommunications network 102 are shown.

The illustrative operating environment 100 of FIG. 1 is shown having user equipment and/or a plurality of mobile devices 106A and 106B in communication with the telecommunications network 102. The mobile devices 106A and 106B may be in communication with the cell towers 104A and 104B via wireless-telecommunications links 108A and 108B. Wireless-telecommunications links 108A and 108B enable data to be wirelessly communicated between the mobile devices 106A and 106B and the cell towers 104A and 104B. This allows the mobile devices 106A and 106B to access the Internet by way of, for example, the telecommunications network 102.

The cell towers 104A and 104B include, among other components not shown, a base station. In one embodiment, where LTE technology is employed, the base station is termed an eNodeB. Such a base station may be a large-coverage access component, in one embodiment. A large-coverage access component, compared to a small-coverage access component, is able to communicate data over a longer distance and is typically associated with a cell tower, such as cell tower 104A or 104B, while a small-coverage access component is only able to communicate over short distances. Examples of small-coverage access components include femto cells and pico cells. The cell towers 104A and 104B are in communication with the telecommunications network 102 by way of wireless-telecommunications links 110A and 110B. As used herein, the cell towers 104A and 104B and the base station refer to the equipment that facilitate wireless communication between user equipment, such as the mobile devices 106A and 106B, and the telecommunications network 102.

Additionally, the telecommunications network 102 is communicatively coupled to a server 112. The server 112, for example, may be located on the back-end of the telecommunications network 102 to facilitate transmissions received from the cell towers 104A and 104B and relayed to the server 112 via the telecommunications network 102 such that the server 112 may direct the transmissions to recipient user devices (not shown). The server 112 may include software, hardware, and/or other components that facilitate voice calls, text messaging, Internet access, etc., over the telecommunications network 102. Further, the server 112 may monitor and optimize the telecommunications network 102 by monitoring data traffic and implementing data traffic management techniques.

Figure 2:
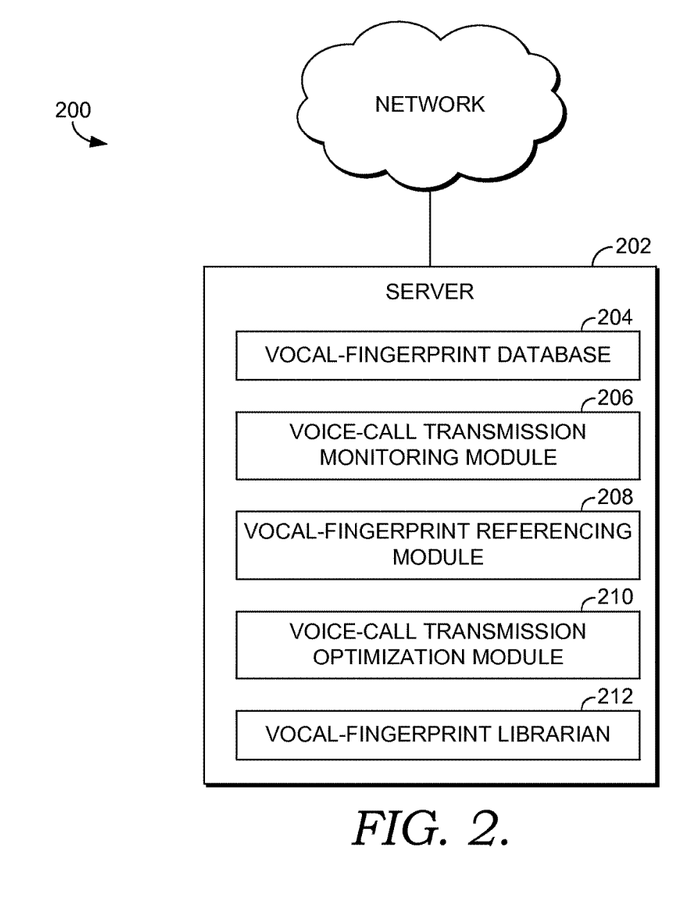
FIG. 2 depicts an exemplary system for optimizing call quality and network efficiency, in accordance with an embodiment of the present invention.

FIG. 2 depicts an exemplary system 200 for optimizing call quality and network efficiency. The system 200 includes a server 202 coupled to a wireless network, such as exemplary telecommunications network 102 shown in the exemplary operating environment 100 of FIG. 1. The server 202 includes a vocal-fingerprint database 204, a voice-call-transmission monitoring module 206, a vocal-fingerprint referencing module 208, and a voice-call-transmission optimization module 210. In further embodiments, the system 200 includes a vocal-fingerprint librarian 212. The exemplary modules and components depicted in the system 200 are only a few examples of suitable modules or components and are not intended to suggest any limitation as to the scope of use or functionality of the invention. Neither should the modules and components be interpreted as having any dependency or requirement relating to any one or combination of modules and components illustrated therein. Although some modules are shown in the singular, they might be plural. Additionally, although some modules are depicted as plural in occurrence, in actuality, they may be singular.

The server 202 includes a vocal-fingerprint database 204. The vocal-fingerprint database 204 is generally configured to store one or more vocal fingerprints. In embodiments, the vocal-fingerprint database 204 may be configured to store a plurality of vocal fingerprints. In further embodiments, the plurality of vocal fingerprints forms a library of vocal fingerprints that may be referenced by one or more components of the server 202 and/or the system 200, described hereinafter. As such, a plurality of vocal fingerprints may be cataloged, grouped, organized, and/or sorted within the vocal-fingerprint database 204 for easier referencing and updating via other components and modules in the system 200.

Each vocal fingerprint generally corresponds to, describes, or specifies a frequency transmission range of a human voice. A frequency transmission range refers to the human voice as input to, or captured by, a microphone coupled to and/or integrated with a device, for example, a mobile phone. A vocal fingerprint may be one-of-a-kind or unique such that it may be used to identify a single, particular individual user, for example. The individual user may be identified by frequency peaks and harmonics that are specific to the individual user's voice, as captured via a microphone coupled to a device and as used to make a voice call. Frequency, as used herein, describes the periodic nature of a sound wave and may be defines as the number of cycles of a wave over a period of time. For our purposes, frequency may be measured in hertz (Hz), defined as the number of wave cycles per one second of time. Harmonics may generally be described as integer multiples of a frequency (e.g., a fundamental frequency), such that a second harmonic of a frequency is twice the frequency, while a third harmonic is three times the frequency, for example. As such, a vocal fingerprint may be generated or otherwise created from a user's voice as input to a microphone, wherein the input may be used to generate a vocal fingerprint (e.g., associated with the user or the user device) that includes the frequency peaks and harmonics of the user's voice. Further, a vocal fingerprint may be based on one or more of the user's voice and speech characteristics and/or patterns that may uniquely identify the particular user, for example. Additionally, a user's voice (e.g., as captured by a microphone, recorded, or transmitted in real time) may be analyzed to identify one or more frequency peaks and one or more harmonics that may be stored in a vocal fingerprint. The vocal fingerprint may be used to identify the specific user by analyzing frequency peaks and harmonics of a voice within one or more of a voice-call transmission, a speech-to-text application, a voice command function, or a voice configuration setup, for example. The human voice generally expresses unique and recognizable frequency peaks and harmonics during speech that are identifiable and may be mapped with a spectrograph.

The frequency peaks and harmonics, therefore, form at least one portion of a vocal fingerprint that is specific to a user's voice and distinguishable from other users' voices and other users' vocal fingerprints. For example, the vocal fingerprint of user A may be distinguished from the vocal fingerprint of user B because the frequency peaks and harmonics of user A are different from the frequency peaks and harmonics of user B. In a further example, the vocal fingerprint of user A may indicate that user A generally exhibits a vocal range from 90 Hz to 150 Hz, whereas the vocal fingerprint of user B may indicate that user B generally exhibits a vocal range from 170 Hz to 240 Hz. Thus, during a voice-call transmission between user A and user B, user A's speech may be analyzed and distinguished from user B's speech by using each vocal fingerprint as it corresponds to each of user A and user B. A frequency range of a user's speaking voice is merely one aspect, quality, or characteristic that may be stored within a vocal fingerprint, however. Additional information regarding a user's voice stored in a vocal fingerprint might include one or more frequencies, one or more frequency ranges, one or more harmonics, a harmonic series, pitch, a regional accent, pronunciation of vowels (i.e., a, e, i, o, and u in the English language), a lisp, a stutter, syllable emphasis patterns, vocal fry, or other voice and speech usage aspects which may be detected, identified, and analyzed. Further, one or more voice classification systems (e.g., soprano, baritone) may be stored within a vocal fingerprint, in further embodiments.

It will be understood by those in the art that a voice-call transmission encodes a range of frequencies of all sound input via a microphone of a mobile device into data for transmission over a telecommunications network. Generally, the microphone may capture sound over a 4 kHz range for example, although greater ranges are anticipated as technology advances. As such, this description may refer to frequencies of the sound captured by a microphone for simplicity; however, it will be understood that frequencies of a voice-call transmission may actually be encoded as data or data packets, in embodiments.

Additionally, it will be understood that aspects of the invention described herein are applicable for optimizing high-definition (HD) voice. HD voice is a wideband audio technology that transmits, for example, audio frequencies from 50 Hz to 7 kHz. Previous voice technologies were more limited in range, transmitting 300 Hz to 3.4 kHz, for example. As such, HD voice allows transmission of a wider range of frequencies and therefore, inherently captures additional background noise and ambient sound.

As described herein, a vocal fingerprint may correspond to one user, be associated with one user, describe one user's voice, or otherwise represent one user's voice such that the vocal fingerprint includes a frequency transmission range of the one user's voice. Alternatively, a single vocal fingerprint may correspond to more than one user and more than one voice. A single vocal fingerprint corresponding to more than one individual user may correspond to, describe, or represent a frequency transmission range of a population of users, in some embodiments. In this way, a vocal fingerprint may include information regarding frequency peaks and harmonics of multiple users having a similar vocal quality or vocal characteristic, in various embodiments. In some embodiments, a vocal fingerprint corresponding to more than one user may be a vocal fingerprint profile. For example, a first vocal fingerprint may correspond to the frequency transmission range (e.g., aggregated or averaged) of multiple adult male voices and, as such, may refer to an adult male vocal fingerprint or an adult male vocal fingerprint profile. In another example, a second vocal fingerprint may describe or represent the frequency transmission range of adult female voices and, as such, may refer to an adult female vocal fingerprint or an adult female vocal fingerprint profile. Other examples of vocal fingerprints and vocal fingerprint profiles may include an adolescent, youth, or child vocal fingerprint. In yet another example, a third vocal fingerprint may correspond to, or describe, the frequency transmission range of both a population of adult male voices and a population of adult female voices, such that the third vocal fingerprint is a composite adult vocal fingerprint. In a further example, a fourth vocal fingerprint may correspond to a population of users having or sharing a voice characteristic (e.g., a regional accent associated with Boston, Minnesota, Georgia, Texas, or a national accent associated with France or the United Kingdom). In yet further examples, a fifth vocal fingerprint corresponds to multiple vocal qualities, such as a population of users expressing a regional accent and having an adult female vocal range. In another example, a sixth vocal fingerprint corresponds to the entire population of individual users using a network or service provider, and as such, the sixth vocal fingerprint may refer to a global vocal fingerprint. Accordingly, any number and type of vocal fingerprints and vocal fingerprint profiles may be generated, combined, and/or utilized with the systems and methods described herein. Vocal fingerprints may further be grouped, sorted, and organized based on one or more voice characteristics. Further, vocal fingerprints may be compiled to form categories and subcategories of vocal fingerprint profiles.

Although depicted in the singular, the vocal-fingerprint database 204 may, in actuality, include more than one database. For example, a first database might store only vocal fingerprints that each correspond to an individual user, whereas a second database might store only vocal fingerprint profiles that each correspond to a plurality of individual users or a population of individual users. As such, the vocal-fingerprint database 204 might include one or more storage databases that are centralized or distributed in a network, for example.

Notably, the frequency transmission range of a vocal fingerprint generally corresponding to a human voice is significantly smaller (e.g., may span several hundred frequencies) than the whole frequency range of an HD voice voice-call transmission because a microphone of a device may capture a much greater range (e.g., may span several thousand frequencies), for example. As such, the vocal fingerprint represents only a portion of the entire frequency range of a voice-call transmission. As such, while HD voice allows for clearer voice calls, HD voice technology also introduces a non-negligible amount of background noise and ambient sound, which may obscure a user's voice. As such, the smaller range of the vocal fingerprint will omit and/or not include portions of the background noise and ambient sound captured by the microphone.

Continuing, the vocal-fingerprint database 204 may be generated, created, and/or otherwise populated with one or more vocal fingerprints and/or vocal fingerprint profiles based on received and/or intercepted voice calls, for example. Additionally or alternatively, the vocal-fingerprint database 204 may be populated with one or more vocal fingerprints generated during setup or configuration of vocal optimization features on a mobile device. A setup or configuration of vocal optimization features on a mobile device might be automatic or, alternatively, might be selected or manually triggered by a user. A setup or configuration of vocal optimization features may be initiated or completed in response to one or more of an initial setup of a new mobile device, a reset of a mobile device, a prompt for a user to allow voice optimization via network monitoring, a user selection to authorize vocal optimization features via a mobile device, a user selection to perform a voice optimization setup, a user selection to run a voice optimization program, etc. These examples are not meant to be limiting and other engagements of vocal optimization features are contemplated to be within the scope of this description. Additionally, separate programs and applications on a mobile device that utilize a user's voice as input to a microphone (e.g., a sound capturing device or receiver) may be exploited for the purposes of the invention disclosed. Other programs might include voice-to-text applications and voicemail programs, for example. In one example, upon initialization of a mobile device, a user may be provided the option to voluntarily participate in a voice optimization program or authorize voice optimization features. As such, the user may choose to participate and allow recording and analysis of the user's voice-call transmissions, outgoing and incoming to the mobile device over a service provider's telecommunications network, in such an example. Additionally or alternatively, the user may enable recording of the user's voice when the user is prompted by voice optimization features to read a snippet of words or a text sequence aloud into a microphone of the mobile device, in further examples. The recording may then be analyzed, in real time or subsequently, either on the mobile device or remotely on a network server, in such examples. The snippet of words or text sequence may be specially designed to elicit specific and identifying voice characteristics of a user such as frequency peaks, harmonics, and speech patterns. Ultimately, using voice calls and/or a voice optimization setup, a vocal fingerprint for an individual user may be generated from the analyzed voice information and stored in the vocal-fingerprint database 204. The vocal fingerprint may include frequency peaks and harmonics of the user's voice, as well as other voice and speech patterns.

In further embodiments, when voice optimization features are activated or authorized, additional voice configurations and subsequent voice-call transmissions may be monitored, recorded, and analyzed to refine or 'hone' the vocal fingerprint of the user. The refinement may be an iterative process that is performed until a vocal fingerprint encompasses all or nearly all descriptive and identifiable aspects of the individual user's voice with a degree of certainty and/or statistical significance, in embodiments. For example, every voice call initiated by the user may be monitored for three days after authorization of monitoring. Then, one voice call a day is randomly monitored for one week after the three-day period. The voice calls might, therefore, be sampled over time to modify and update the vocal fingerprint of the user. As each new voice call provides more voice information, less voice calls may be recorded and analyzed over time, depending on the amount or volume of voice calls made by the user. With each analysis and modification, the user's vocal fingerprint may become a more accurate representation or description of the individual user's voice. Accuracy of the vocal fingerprint is important to the optimization process, as inaccuracy regarding a user's vocal frequency range may lead to accidental loss of portions of a voice-call transmission. Each of the vocal fingerprints in the vocal-fingerprint database 204 may be similarly modified, periodically or continuously, using corresponding user voice activity to increase accuracy of each vocal fingerprint. Eventually, the updates and modifications of a vocal fingerprint may halt or stop when it is determined that the vocal fingerprint is found to be statistically accurate. Further, updates and modification of a vocal fingerprint may be regular, intermittent, or random, once the vocal fingerprint is found to be statistically accurate.

The server 202 also includes a voice-call-transmission monitoring module 206. The voice-call-transmission monitoring module 206 is generally configured to receive and/or intercept one or more incoming voice-call transmissions (e.g., voice data is intercepted prior to reaching the call recipient). Although described herein with reference to a voice call, other types of voice transmissions (e.g., walkie-talkie) are contemplated, and this description is not meant to be construed as limited to telephone calls. Accordingly, the voice-call-transmission monitoring module 206 may receive a voice-call transmission over a wireless communications network, such as the exemplary telecommunications network 102 of FIG. 1. The voice-call-transmission monitoring module 206 may receive a plurality of voice-call transmissions, one at a time, or alternatively, more than one at a time. The voice-call-transmission monitoring module 206 may, in further embodiments, receive voice-call-transmissions in real time or near real time. As such, the voice-call-transmission monitoring module 206 may receive more than one voice-call transmission in the order it was placed or in the order it was received at the server 202, in embodiments.

The voice-call-transmission monitoring module 206 may monitor, periodically or continuously, one or more voice calls between a caller and a call recipient. Monitoring may include identifying the individual user who is making or receiving a voice call using one or more of an identifier of a mobile device associated with the individual user and/or a vocal fingerprint associated with the individual user, in some embodiments. For example, a unique identifier associated with the individual user's mobile device may be used to identify the likelihood that the individual user is placing or receiving a call via the mobile device. In another example, the individual user instructs the mobile device to initiate a voice call using voice commands, and a vocal fingerprint associated with the individual user is utilized to identify and/or verify that the individual user is initiating a voice call by analyzing the voice commands. Monitoring, in some embodiments, may be triggered or switched on when an individual user initiates an outgoing voice call. Monitoring, in other embodiments, may be triggered or switched on when an individual user's voice is detected and/or identified using a vocal fingerprint associated with the individual user during either an outgoing or incoming voice call.

Monitoring may include recording one or more portions of a voice call, in embodiments. For example, in order to allay privacy concerns, only non-consecutive portions of a voice call may analyzed, as recorded or as received in real time, to identify frequency peaks and harmonics of one or more users' voices in the voice-call transmission. Additionally or alternatively, only portions of a voice-call transmission wherein the individual user's voice is identified may be recorded, such that only one side of a conversation in a voice-call transmission may be recorded. In other words, monitoring may utilize a vocal fingerprint of an individual user so as to only record, or selectively record, only those portions of a voice-call transmission wherein the individual user is actively speaking. In this way, the voice of a call recipient might not be recorded, thereby avoiding privacy and/or recording-authorization concerns. Further, and additionally or alternatively, only non-identifying data may be utilized such that the language content (e.g., words and sentences) of a voice-call transmission might not be recorded or may not be reconstructed from the data. Other methods for recording the frequency peaks and harmonics of a voice-call transmission while preserving privacy of voice-call content and identity that may be known to those in the art may be employed as well. In further examples, any recorded voice-call transmission or portions thereof are immediately deleted or erased as soon as analysis is complete, or as soon as a vocal fingerprint or vocal fingerprint profile is updated. In other embodiments, entire or full voice-call transmissions may be analyzed and/or recorded. In such other embodiments, both the individual user acting as a caller and another individual user acting as a call recipient, for example, may both have authorized call monitoring for voice-call optimization features. Thus, the entire call might be recorded and analyzed to separately optimize the vocal fingerprint associated with the individual user (e.g., caller) and a different vocal fingerprint associated with the other individual user (e.g., call recipient). Further, in some embodiments, the entire call might be recorded and/or analyzed to optimize a vocal fingerprint profile using both the individual user (e.g., caller) and the other individual user (e.g., call recipient), wherein both users belong to the same or a similar population (e.g., adult female fingerprint), or share a vocal characteristic (e.g., similar regional accent). In one example, an analysis of both users' frequency peaks and harmonics may be used to modify or update one vocal fingerprint. In another example, a billing zip code associated with a mobile device or a location associated with the individual of the mobile device may be utilized to determine that voice-call transmission data may be analyzed and used to update one or more vocal fingerprints or vocal fingerprint profiles that are associated with the billing zip code or the location.

The voice-call-transmission monitoring module 206 may communicate a vocal-fingerprint referencing module 208 in order to perform or achieve the monitoring functions described hereinabove. As such, the voice-call-transmission monitoring module 206 may work in tandem with the vocal-fingerprint referencing module 208. The vocal-fingerprint referencing module 208 may be generally configured to reference the vocal-fingerprint database 204. Accordingly, the vocal-fingerprint referencing module 208 may reference one or more than one of the vocal fingerprints and/or vocal fingerprint profiles stored in the vocal-fingerprint database 204. Specifically, the vocal-fingerprint referencing module 208 may be configured, generally, to use the vocal-fingerprint database 204 to identify one or more frequency ranges associated with a voice-call transmission and that are the same or similar to a vocal fingerprint(s). Additionally or alternatively, the vocal-fingerprint referencing module 208 may reference a vocal fingerprint associated with an identifier corresponding to a mobile device participating in the voice-call transmission. As such, the vocal-fingerprint referencing module 208 may provide one or more vocal fingerprints to the voice-call-transmission monitoring module 206 for monitoring purposes, including recording voice-call transmission data, for example. In this way, the vocal-fingerprint referencing module 208 may aid the voice-calltransmission monitoring module 206 with identifying individual users. Alternatively, the voice-call-transmission monitoring module 206 may provide voice-call transmission data to the vocal-fingerprint referencing module 208, which is then configured to identify vocal fingerprints stored in the vocal-fingerprint database 204 that have a frequency transmission range that encompasses, aligns with, matches, or is similar to the frequency peaks and harmonics found, as analyzed, in the voice-call transmission. Additionally, the vocal-fingerprint referencing module 208 may also be configured to identify vocal fingerprints that do not match, or are dissimilar to, any provided voice-call information and/or data.

Once vocal fingerprints and/or vocal fingerprint profiles are referenced, the voice-call-transmission optimization module 210 is engaged or utilized. Using one or more referenced vocal fingerprints, the voice-call-transmission optimization module 210 may be configured to determine one or more frequency ranges of a received voice-call transmission that outlie a frequency transmission range of the referenced vocal fingerprints. The voice-call-transmission optimization module 210 may be generally configured to remove any frequencies and/or frequency ranges in a voice-call transmission that are outside of, or outlie, a frequency transmission range of a vocal fingerprint in order to optimize the current voice call and/or subsequent voice calls. One or more frequencies that are not within a frequency transmission range specified in a referenced vocal fingerprint may be referred to as outlying frequencies, outlier frequencies, and/or outlier frequency ranges. The voice-call-transmission optimization module 210 may filter out, excise, and/or otherwise remove outlying frequencies and/or outlier frequency ranges, including corresponding data, from the voice-call transmission and corresponding data, in some embodiments. Once the outlying frequency range(s) of the voice-call transmission are filtered out or removed, the voice-call transmission comprises a remaining portion. The remaining portion generally corresponds to frequencies near or within the frequency transmission range of one or more referenced vocal fingerprints and/or vocal fingerprint profiles stored in the vocal-fingerprint database 204. The voice-call-transmission optimization module 210 removes outlying frequency ranges of a voice-call transmission prior to transmitting the remaining frequency range of a voice transmission to a call recipient. The remaining voice-call transmission (e.g., remaining frequency range) includes a frequency range that generally corresponds to, or is found to be within, the frequency transmission range of the referenced vocal fingerprint. Accordingly, the remaining voice-call transmission data (e.g., remaining frequency range) may be transmitted over the telecommunications network to a call recipient, who thus does not receive any outlying frequencies. As such, the remaining voice-call transmission (e.g., remaining frequency range) includes reduced background noise and includes less extraneous ambient sound, resulting in an HD voice call that prominently and clearly showcases the caller's voice, as filtered through the vocal fingerprint that was referenced. Alternatively, the voice-call-transmission optimization module 210 omits outlier frequency ranges prior to transmitting the remaining voice-call transmission data to a call recipient. In embodiments, the remaining voice-call transmission data (e.g., remaining frequency range) may include a number of outlier frequencies that are close to or near (e.g., "neighboring outlier frequencies") the outermost frequencies of the frequency transmission range of a referenced vocal fingerprint. This may prevent the accidental loss of voice-call transmission data caused when a user's voice unexpectedly exceeds the boundaries of a frequency transmission range of a corresponding vocal fingerprint. Examples might include a user speaking in a high pitched and excited manner or a user whispering in a lower voice register. As such, neighboring outlier frequencies may be retained and transmitted due to their proximity to the edge or boundaries or the frequency transmission range of a referenced vocal fingerprint.

In further embodiments, the server 202 includes a vocal-fingerprint librarian 212. The vocal-fingerprint librarian 212 may be configured to modify and/or update one or more of the plurality of vocal fingerprints and/or vocal fingerprint profiles stored in the vocal-fingerprint database 204. The vocal-fingerprint librarian 212 may modify various aspects of a vocal fingerprint such that the vocal fingerprint reflects frequency range, frequency peaks, harmonics, and other information received from analysis of voice-call transmissions. As such, the vocal-fingerprint librarian 212 may periodically or continuously modify and/or update one or more of the vocal fingerprints and/or vocal fingerprint profiles in response to one or more voice-call transmissions received by the server.

The exemplary modules depicted in the system 200 are only a few examples of suitable modules or components and are not intended to suggest any limitation as to the scope of use or functionality of the invention. Neither should the modules be interpreted as having any dependency or requirement relating to any one or combination of components illustrated therein. Although some modules are shown in the singular, they might be plural. Additionally, although some modules are depicted as plural in occurrence, in actuality, they may be singular.

Figure 3:
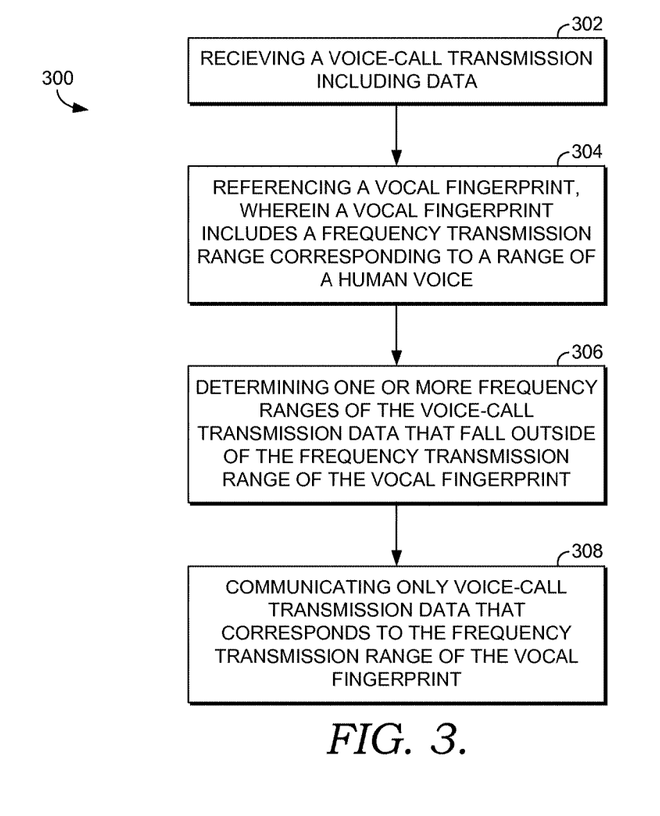
FIG. 3 depicts a flow chart of a method for improving call quality by filtering out frequencies outside of a specified frequency transmission range, in accordance with an embodiment of the present invention.
Figure 4:
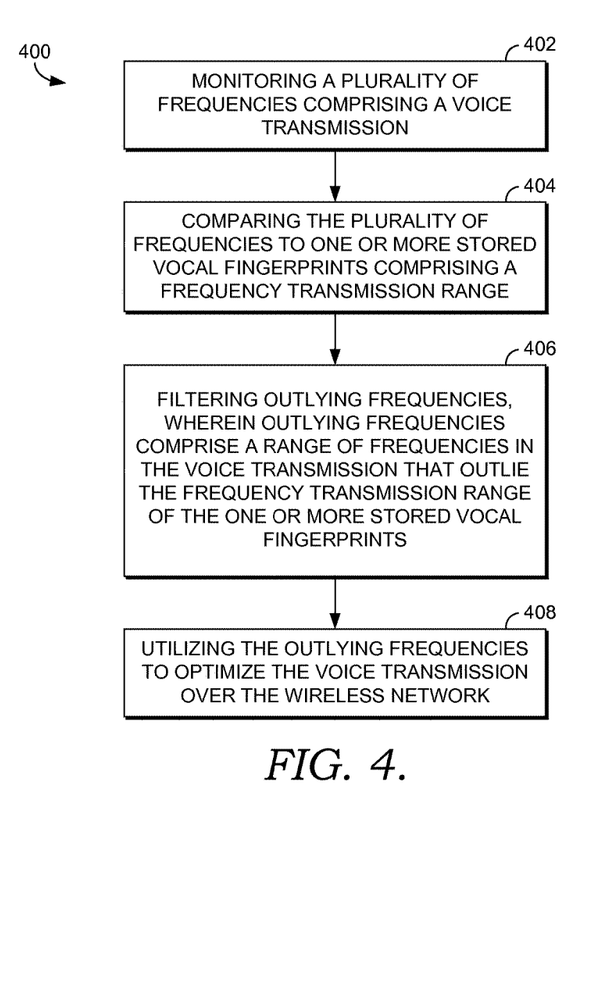
FIG. 4 depicts a flow chart of another exemplary method for maintaining and improving voice-call quality over a wireless network, in accordance with an embodiment of the present invention.

Turning now to FIGS. 3 and 4, exemplary methods 300 and 400 are illustrated as a collection of blocks representing operations that can be implemented in the exemplary operating environment 100 of FIG. 1, the exemplary system 200 described with respect to FIG. 2, hardware, software, firmware, or a combination thereof. The order in which the methods 300 and 400 are described is not intended to be construed as a limitation, and any number of the described method blocks can be combined in any order to implement the methods, or alternate methods. The blocks should not be interpreted as having any sequential requirement or dependency related to any module(s), component(s), or combination thereof. Additionally, individual operations may be omitted from the methods 300 and 400 without departing from the spirit and scope of the subject matter described herein. In the context of software, the blocks represent computer instructions that, when executed by one or more processors, perform the recited operations.

FIG. 3 depicts a method 300 for improving call quality by filtering out frequencies outside of a specified frequency transmission range. The method includes, at block 302, receiving a voice-call transmission including data. Generally, the voice-call transmission creates a connection with a call recipient. However, the voice-call transmission may first be received and/or otherwise intercepted at a server, such as exemplary server 202 shown in illustrative FIG. 2, for example. At block 304, the method includes referencing a vocal fingerprint, wherein a vocal fingerprint includes a frequency transmission range corresponding to a range of a human voice. As such, when a user begins speaking into their mobile device, the user's voice, ambient sound, and background noise are all captured by a microphone (e.g., the microphone may capture all sound within a 4 kHz range) of the mobile device and transmitted to a server in a telecommunications network. As such, the voice-call transmission includes a wide frequency range of sound in addition to the frequency range of the user's voice. However, the user's voice may be identified and/or compared to one or more vocal fingerprints stored on the server in a database and/or locally on the mobile device. Exemplary components or modules on a server might perform these steps, such as the vocal-fingerprint referencing module 208 and the vocal-call-transmission monitoring module 206 shown in illustrative FIG. 2. In embodiments, the mobile device may communicate, to the intercepting server, a most frequently referenced vocal fingerprint associated with the mobile device, associated with a user of the mobile device, or associated with an identifier of the mobile device. Additionally or alternatively, the mobile device may communicate a preferred vocal fingerprint and/or an identifier of a vocal fingerprint to the server. This information may be included with or within the voice-call transmission data. As such, a vocal fingerprint may be referenced for optimizing the voice-call transmission.

In further embodiments, the method includes determining one or more frequency ranges of the voice-call transmission data that fall outside of the frequency transmission range of the referenced vocal fingerprint, shown at block 306. One or more frequency ranges of the voice-call transmission data that are outside of the frequency transmission range of the vocal fingerprint may be determined, in some embodiments. Identification and determination of outlier frequencies and outlying frequency ranges, for example, might be performed by the exemplary voice-call-transmission optimization module 210 depicted in illustrative FIG. 2, in some embodiments. In one example, a plurality of vocal fingerprints is referenced to make the determination of outlier frequency ranges. In another example, a frequency transmission range of a single vocal fingerprint is referenced, wherein the single vocal fingerprint represents a plurality of individual users associated with a plurality of mobile devices on a wireless network. In yet another example, a frequency transmission range of a single vocal fingerprint that uniquely identifies one individual user is referenced to make the determination of outlier frequency ranges. Further, in some embodiments, a single vocal fingerprint may be further associated with a mobile device of the individual user identified by the vocal fingerprint.

In yet another embodiment, the method includes identifying an upper buffer range and/or lower buffer range, which are referenced in addition to one or more vocal fingerprints. Alternatively, an upper buffer range is a vocal fingerprint and a lower buffer range is another vocal fingerprint, or an upper buffer range and a lower buffer range are both included in one vocal fingerprint. Generally, an upper buffer range and lower buffer range flank the frequency transmission range of a vocal fingerprint. For example, when a vocal fingerprint is referenced that specifies a frequency transmission range of 165 Hz to 255 Hz, an upper buffer range may be referenced which specifies 255 Hz to 265 Hz and a lower buffer range may be referenced which specifies 155 Hz to 165 Hz. The frequency ranges of an upper buffer range and a lower buffer range may be included or considered in addition to one or more vocal fingerprints that are referenced. An upper buffer range and a lower buffer range may be referenced and utilized to expand the remaining frequency range. This also reduces the outlying frequency range. The upper buffer range and lower buffer range, as incorporated into the method 300, prevent accidental omission of voice frequencies that may be near the outer limits of the frequency transmission range, or may outlie the frequency transmission range of ordinary speech. For example, user A is associated with a vocal fingerprint having a frequency transmission range of 165 Hz to 255 Hz. However, when user A reacts to exciting news during a voice transmission, the voice of user A may exceed 255 Hz. The addition of the upper buffer range of 255 Hz to 265 Hz prevents the excited voice of user A from being filtered out of the voice transmission. In another example, user B is associated with a vocal fingerprint having a frequency transmission range of 85 Hz to 180 Hz, generally. During a voice transmission, user B decides to whisper sensitive information into his mobile device because he is walking in a crowded, non-private location. As his voice register drops, a lower buffer range of 65 Hz to 85 Hz prevents the lower register of user B from being filtered out of the voice transmission. In yet another example, the upper buffer range and the lower buffer range allow for a portion of natural or ambient sound surrounding user C to be retained within the voice transmission. The partial retention of natural sound may prevent a recipient of a voice transmission of user C from believing the line to be dead or disconnected due to a lack of natural sound in the voice transmission.

After identifying one or more frequency ranges of the voice-call transmission received that outlie the referenced vocal fingerprint, the method 300 further includes communicating only voice-call transmission data that is within the frequency transmission range of the vocal fingerprint, shown at block 308. In some embodiments, the communication of only voice-call transmission data that is within the frequency transmission range of the vocal fingerprint might be performed by the exemplary vocal-call-transmission optimization module 210 shown in illustrative FIG. 2, for example. Accordingly, the original frequency range of the voice-call transmission as received is reduced such that a smaller range of frequencies is transmitted. The voice-call transmission itself is now optimized for improved call quality and requires less bandwidth as well. The optimization of multiple voice-call transmissions over the network increases overall call quality and reduced bandwidth load.

FIG. 4. depicts a method 400 for maintaining and improving voice-call quality over a wireless network. The exemplary method 400 of FIG. 4 may be performed by a computer-program product that includes computer-useable instructions embodied on one or more computer-readable media.

The method 400 includes monitoring a plurality of frequencies comprising a voice transmission, shown at block 402. The plurality of frequencies of the voice transmission is compared, at block 404, to one or more vocal fingerprints, as stored. The vocal fingerprints include a frequency transmission range and may be stored at a remote database or stored locally on a mobile device, for example. At block 406, the method includes filtering outlying frequencies. Outlying frequencies generally include a range of frequencies of the plurality of frequencies of the voice transmission that outlie the frequency transmission range of the one or more stored vocal fingerprints. The outlying frequencies are utilized to optimize the voice transmission over the wireless network, shown at block 408.

Optimizing the voice transmission over the wireless network may include filtering the outlying frequencies out of the voice transmission and transmitting the remaining frequencies (e.g., frequencies of the voice transmission within the frequency transmission range of a vocal fingerprint) to a voice transmission recipient. The optimization of the voice transmission may be applied to any number of voice transmissions over the wireless network. Thus, each voice transmission is reduced from its original frequency range as received, to include a smaller frequency range when transmitted to a recipient. In one example, the original voice-call transmission received at the server includes sounds captured over a 4 kHz range. However, after optimization that removed or disregarded all sounds captured outside of a referenced vocal fingerprint corresponding to the voice of a user, only sounds corresponding to about a 300 Hz range were transmitted to the recipient. Thus, a smaller frequency range is transmitted after optimization. And accordingly, each optimized voice transmission requires less bandwidth, thereby greatly conserving resources of the entire wireless network. Additionally, each optimized voice transmission experiences an improved call quality as transmitted to and received by the voice transmission recipient.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for improving call quality by filtering out frequencies outside of a specified frequency transmission range, the method comprising:
via a server:
monitoring one or more voice-call transmissions of an individual user;
analyzing data of the one or more voice-call transmissions monitored to identify frequency peaks and harmonics of the individual user's voice;
generating a vocal fingerprint that is specific to the individual user from the analyzed data of the one or more voice-call transmissions monitored, wherein the vocal fingerprint includes a frequency transmission range, frequency peaks, and harmonics that uniquely correspond to the individual user's voice;
storing the vocal fingerprint that is specific to the individual user on a server;
receiving another voice-call transmission of the individual;
matching frequency peaks and harmonics in the voice-call transmission received to the frequency peaks and harmonics of the vocal fingerprint that is specific to the individual user and stored on the server;
based on the matching vocal fingerprint that includes the frequency transmission range, frequency peaks, and harmonics that uniquely correspond to the individual user's voice, removing data from the received voice-call transmission that outlies the frequency transmission range of the matching vocal fingerprint; and
communicating the remaining data of the voice-call transmission to a recipient of the voice-call transmission.

2. The method of claim 1, wherein the vocal fingerprint includes an individual user profile associated with a mobile device.

3. The method of claim 1, further comprising identifying an upper buffer range and a lower buffer range of the frequency transmission range of the vocal fingerprint.

4. The method of claim 1, further comprising identifying data of the received voice-call transmission corresponding to the frequency transmission range of the vocal fingerprint.

5. The method of claim 4, wherein the data of the received voice-call transmission identified as corresponding to the frequency transmission range of the vocal fingerprint includes one or more frequency ranges at or within the upper buffer range or the lower buffer range of the frequency transmission range of the vocal fingerprint.

6. The method of claim 1, wherein the frequency transmission range of the vocal fingerprint specifies a frequency range of 85 hertz to 180 hertz, 165 hertz to 255 hertz, or a combination thereof.

7. The method of claim 1, wherein the voice-call transmission includes a frequency range corresponding to a high-definition (HD) voice frequency range.

8. A system for optimizing overall network call quality and reducing network bandwidth load, the system comprising:
a server communicatively coupled to a wireless network, wherein the server includes:
a voice-call-transmission monitoring module that:
monitors intercepted voice-call transmissions;
for each of the intercepted voice-call transmissions, identifies a frequency transmission range, frequency peaks, and harmonics that correspond to a voice in the intercepted voice-call transmissions; and
generates a plurality of vocal fingerprints, each of the plurality of vocal fingerprints corresponding to different individual users and that are usable to specifically identify the voices of the different individual users using the frequency transmission ranges, frequency peaks, and harmonics identified;
a vocal-fingerprint database storing the plurality of vocal fingerprints, each of the plurality of vocal fingerprints corresponding to different individual users, each of the plurality of vocal fingerprints including the frequency transmission range, the frequency peaks, and the harmonics of the voice of one individual user, wherein the frequency transmission range, the frequency peaks, and the harmonics of each of the plurality vocal fingerprints are usable to specifically identify the voice of the one individual user;
a vocal-fingerprint referencing module that references the vocal-fingerprint database to:
identify when the frequency transmission range, frequency peaks, and harmonics of one of the plurality of vocal fingerprints in the vocal-fingerprint database matches any additional intercepted voice-call transmissions; and
determine one or more frequency ranges of the additional intercepted voice-call transmissions that outlie the frequency transmission ranges of the one of the plurality of vocal fingerprints identified as corresponding to the additional intercepted voice-call transmissions; and
a voice-call-transmission optimization module that removes the one or more frequency ranges of the additional intercepted voice-call transmissions that outlie the one or more frequency transmission ranges of corresponding vocal fingerprints of the plurality of vocal fingerprints.

9. The system of claim 8, wherein the intercepted voice-call transmissions are high-definition (HD) voice transmissions.

10. The system of claim 8, wherein the voice-call-transmission optimization module removes the one or more frequency ranges of the additional intercepted voice-call transmissions that outlie the one or more frequency transmission ranges of the plurality of vocal fingerprints prior to transmitting a remaining frequency range of the additional intercepted voice-call transmissions to one or more recipients over the wireless network.

11. The system of claim 10, wherein the remaining frequency range corresponds to a frequency range within at least one vocal fingerprint of the plurality of vocal fingerprints.

12. The system of claim 10, wherein the remaining frequency range is less than an original frequency range of the additional intercepted voice-call transmissions before optimization.

13. The system of claim 10, wherein the additional intercepted voice-call transmissions includes a frequency range comprising 1 to 4000 hertz before optimization.

14. The system of claim 8, wherein the plurality of vocal fingerprints stored in the vocal-fingerprint database include one or more of an adult male vocal fingerprint, an adult female vocal fingerprint, an adolescent vocal fingerprint, a child vocal fingerprint, a regional vocal fingerprint, and a national vocal fingerprint.

15. The system of claim 8, further comprising a vocal-fingerprint librarian that modifies one or more of the plurality of vocal fingerprints stored in the vocal-fingerprint database based on frequency information received via the additional intercepted voice-call transmissions.

16. The system of claim 15, wherein the vocal-fingerprint librarian modifies the one or more of the plurality of vocal fingerprints stored in the vocal-fingerprint database periodically, continuously, or upon command.

17. The system of claim 8, wherein the vocal-fingerprint database further includes an upper buffer range and a lower buffer range for each of the plurality of vocal fingerprints.

18. One or more computer-readable storage media having computer-executable instructions embodied thereon are provided that, when executed, perform a method for maintaining and improving voice-call quality over a wireless network, the method comprising:

via a server:
monitoring one or more voice transmissions of an individual user;
analyzing data of the one or more voice transmission to identify frequency peaks and harmonics of the individual user's voice;
generating a vocal fingerprint that is specific to the individual user, wherein the vocal fingerprint includes a frequency range, frequency peaks, and harmonics that uniquely correspond to the individual user's voice;
storing the vocal fingerprint that is specific to the individual user on a server;
receiving another voice transmission of the individual user including a plurality of frequencies;
comparing the plurality of frequencies to the frequency range, the frequency peaks, and the harmonics of the stored vocal fingerprint that is specific to the individual user;
filtering outlying frequencies from the voice transmission based on the comparison to the stored vocal fingerprint, wherein outlying frequencies comprise frequencies in the voice transmission that outlie the frequency range of the stored vocal fingerprint; and
utilizing the outlying frequencies to optimize the voice transmission over the wireless network.

* * * * *